United States Patent [19]

Hoffman et al.

[11] 4,393,594
[45] Jul. 19, 1983

[54] COLLAPSIBLE SCRIBER ASSEMBLY

[75] Inventors: Ronald E. Hoffman, Uniontown, Ohio; William K. Freed, Memphis, Tenn.

[73] Assignee: The Goodyear Tire & Rubber Company, Akron, Ohio

[21] Appl. No.: 337,557

[22] Filed: Jan. 6, 1982

[51] Int. Cl.³ .............................................. G01B 5/255
[52] U.S. Cl. ................................ 33/203.16; 33/21 R
[58] Field of Search .................. 33/18 R, 21 R, 27 R, 33/27 D, 27 F, 27 G, 32 B, 189, 203, 203.15, 203.16

[56] References Cited

U.S. PATENT DOCUMENTS

| | | | |
|---|---|---|---|
| 1,977,297 | 10/1934 | Weaver | 33/203.16 |
| 2,075,421 | 3/1937 | Bennett | 33/203.16 |
| 2,508,849 | 5/1950 | Williams | 33/203.15 |
| 2,717,450 | 9/1955 | Pickering | 33/203.15 |
| 3,808,695 | 5/1974 | La Moreux | 33/203.16 |
| 4,155,170 | 5/1979 | Detwiler | 33/203.16 |

OTHER PUBLICATIONS

Bear, "Wheel Alinement and Balancing Equipment", 1973, pp. 1, 29 and 30.
Bear, "Bear Alignment Racks and Accessories", 1979, pp. 2 and 11.

*Primary Examiner*—Richard R. Stearns
*Attorney, Agent, or Firm*—L. R. Drayer

[57] ABSTRACT

A collapsible apparatus for scribing a line on the circumferential surface of a cylindrical body as the cylindrical body is rotated about its axis. The apparatus may also be used to provide a reference point for checking the radial and lateral runout of the cylindrical body as it rotates about its axis.

5 Claims, 4 Drawing Figures

COLLAPSIBLE SCRIBER ASSEMBLY

BACKGROUND OF THE INVENTION

The present invention relates to an improved scriber assembly which is collapsible, allowing it to be easily transported, especially when the main structural components are made of lightweight hollow tubular materials as described in the preferred embodiment.

The operator or passenger in a wheeled vehicle may feel that the operating or ride characteristics of the vehicle are being adversely affected by non-uniformity of the wheels, or tires mounted on the wheels. Although there are many possible causes of non-uniformity in tires and wheels, which are familiar to persons working in the tire and vehicle technology, such causes often are discernible as variations in the distance from the axis of rotation of a wheel to various points on the circumference of the ground-engaging tread portion of the tire mounted on the wheel, hereafter referred to as the radial runout of the wheel and tire assembly. Another common manner of discerning causes of non-uniformity in wheel and tire assemblies mounted on vehicles is a variation in the distance from a circle marked on the sidewall portion of a tire mounted on a vehicle wheel, with the axis of rotation of the wheel being the center of the circle, to a reference point adjacent to the circle but not in the same vertical plane as the circle, with the shortest distance between the reference point and the circle on the sidewall of the tire being measured as the tire and wheel are rotated while the reference point remains in a fixed position, the range of the measurements taken being referred to as the lateral runout of the wheel and tire assembly. While radial and lateral runout measurements are normally small, they sometimes indicate that corrective action should be sought through a tire dealer or a mechanic. While various types of equipment have been developed for checking radial and lateral runout, such equipment is usually bulky, not collapsible, and can be used only in a specialized testing environment such as a professional garage.

SUMMARY OF THE INVENTION

A primary objective of the invention is to provide a lightweight, easily transportable apparatus that may be used in environments other than a regular testing facility to determine if there are significant variations in the radial and lateral runout of wheel and tire assemblies mounted on a vehicle.

A second objective of the invention is to provide an apparatus for scribing a reference line around the circumference of the ground-engaging tread portion of a tire mounted on a vehicle, with the line being used as a reference for checking toe-in and toe-out measurements of the wheel and tire assemblies mounted on the steering axle of the vehicle.

Other features and advantages of the invention will be apparent from the following description when taken in connection with the accompanying drawings.

BRIEF DESCRIPTION OF THE DRAWINGS

One embodiment of the invention is described below with reference to the drawings, in which.

DESCRIPTION OF PREFERRED EMBODIMENT

Figure 1:
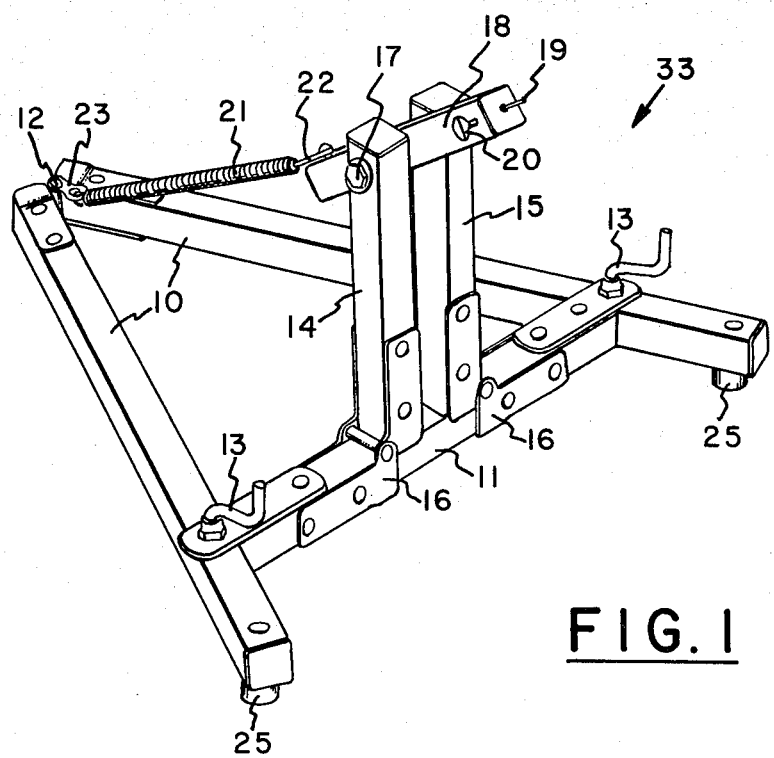
FIG. 1 is a perspective view of a collapsible scriber assembly, assembled and ready for use.

The preferred embodiment of the invention 33 is shown assembled and ready for use in FIG. 1, having a horizontal base assembly comprising two straight bar members 10 and 11 with the first straight bar member 10 hinged 12 at the center of its length. The ends of the second straight bar member 11 are attached to the first straight bar member 10 by a means for attaching and detaching 13. Two straight vertical members 14 and 15 are hingably attached 16 to the second straight bar member 11 of the horizontal base assembly. A pivot mechanism such as a pin or shaft 17 passes through bores in the straight vertical members 14 and 15 and through a bore located near the center of the length of a pivot bar 18, so that the pivot bar may pivot about the pivot mechanism in a vertical plane. A scribe 19 is inserted lengthwise in a well in one end of the pivot bar 18 and held in place by a securing means such as a set screw 20. A coil spring 21, which provides a stabilizing tension on the pivot bar, has one of its ends hooked to an eyelet 22 on the end of the pivot bar opposite the scribe 19 and its other end hooked to an eyelet 23 on the hinge 12 of the first straight bar member 10 of the horizontal base assembly. Supporting feet 25 may be attached at each end of the first straight bar member 10 for added stability.

Figure 2:
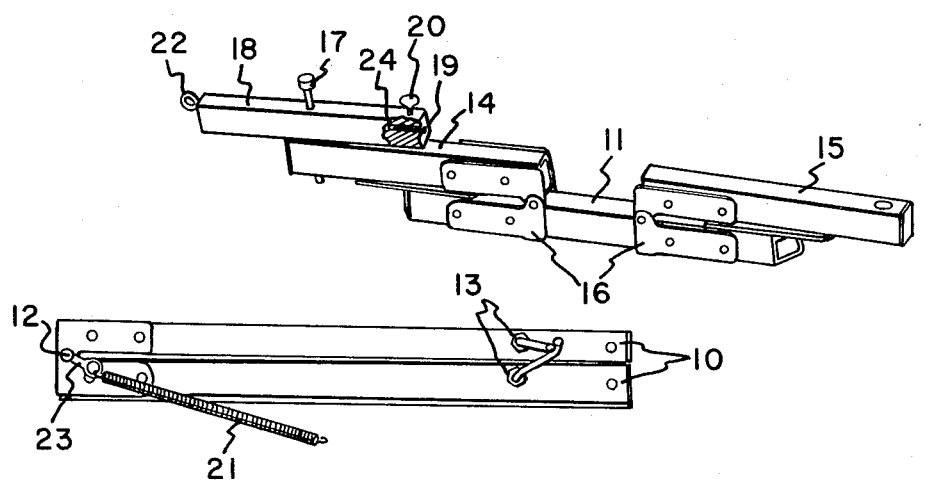
FIG. 2 is a perspective view, partially in section, of the collapsible scriber assembly, collapsed and ready for transporting.

FIG. 2 shows the scriber assembly collapsed and ready to be easily transported. The scriber assembly is collapsed from its assembled state, as shown in FIG. 1, by first detaching the coil spring 21 from the eyelet 22 on the end of the pivot bar 18. The second straight bar member 11 of the horizontal base assembly is then detached from the first straight bar member 10 of the horizontal base assembly by detaching the means for attaching and detaching 13 located at or near the ends of the second straight bar member 11. The ends of the first straight bar member 10 are then brought together by pivoting them about the hinge 12 located at the center of its length. The means for securing the scribe in place 20 is then loosened so that the scribe 19 can slide into the well 24 in the pivot bar 18, so that no portion of the scribe extends beyond the end of the pivot bar, and the means for securing the scribe is then retightened to secure the scribe in the well. The pivot mechanism 17 is then extracted from the aligned bores in the two vertical support members 14, 15 and the pivot bar 18; one of the support members 14 is then pivoted about the hinge 16 attaching it to the second straight bar member 11 until the vertical support member and second straight bar member are parallel and adjacent to each other. The pivot mechanism 17 is then reinserted through the aligned bores in the pivot bar 18 and the vertical support member 14 to hold them together during transportation and storage. The second vertical member 15 is then pivoted about the hinge 16 by which it is attached to the second straight bar member 11 until the second vertical support member and the second straight bar member are parallel and adjacent. The apparatus can be reassembled for use by performing the steps described in reverse order, performing assembling functions when disassembling functions are called for.

Figure 3:
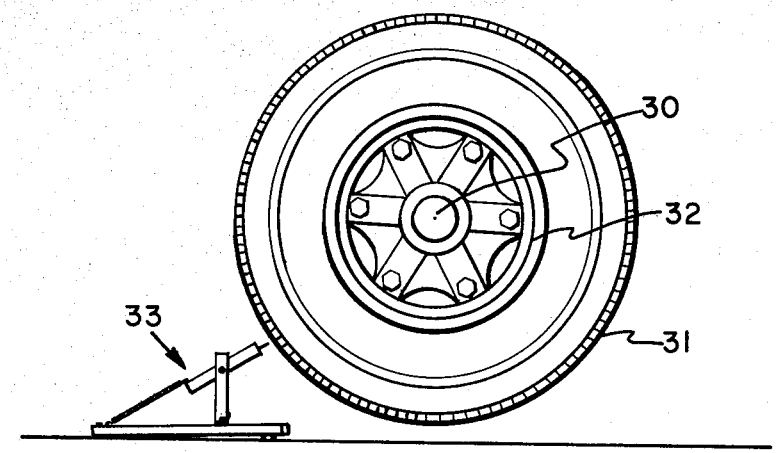
FIG. 3 is a schematic view of the collapsible scriber assembly in position for checking the radial runout of a wheel and tire assembly mounted on a vehicle.
Figure 4:
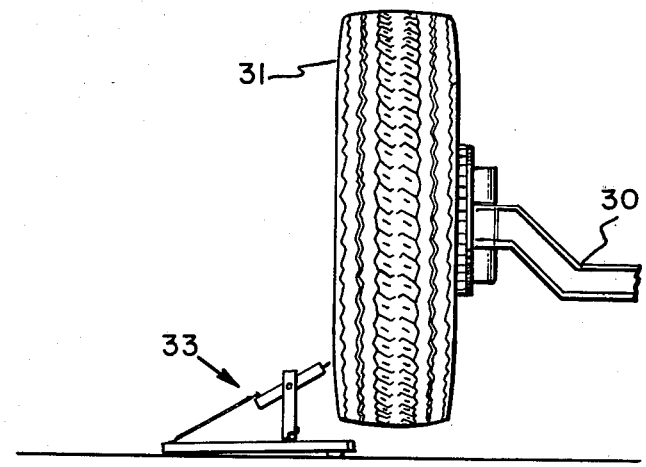
FIG. 4 is a schematic view of the collapsible scriber assembly in position for checking the lateral runout of a wheel and tire assembly mounted on a vehicle.

FIG. 3 and FIG. 4 illustrate the use of the collapsible scriber assembly for checking the radial and lateral runout of a wheel and tire assembly mounted on a vehicle. Before the radial runout can be checked, as illustrated in FIG. 3, the axle 30 of the vehicle must be elevated so that the ground-engaging tread portion of the tire 31 mounted on the wheel 32 is not in contact with the ground. This allows the tire 31 to be rotated freely by hand. The scriber assembly 33 is then placed on the ground with the scribe near, but not in contact with, the ground-engaging tread portion of the tire 31. The tire 31 is then rotated and the distance between the scribe and the ground-engaging tread portion of the tire is measured using a ruler at random locations around the circumference of the tire. If the difference between the smallest and largest measurements noted is more than 3/32 inch (2.381 mm), it is an indication that the radial runout of the wheel and tire assembly is excessive, and corrective action should be sought through a tire dealer or a mechanic.

A second use of the apparatus may also be described using FIG. 3. After the tire 31 has been elevated as described in the preceding paragraph, an easily inscribed medium, such as a quick drying lacquer, is applied to the ground-engaging tread portion of the tire in the area of the centerline of the ground-engaging tread portion completely around the circumference of the tire. The scriber assembly is then positioned with the scribe in contact with the ground-engaging tread portion of the tire, near the centerline. The tire is then rotated by hand so that a reference line is scribed completely around its circumference and is clearly visible in the medium that was applied. The reference line can then be used in checking the toe-in and toe-out of the wheel and tire assembly by methods that are well known.

FIG. 4 illustrates the use of the apparatus in checking the lateral runout of a wheel and tire assembly mounted on a vehicle. A lateral runout check is normally made in conjunction with a radial runout check as described above, but can be made independently. The vehicle axle 30 is first elevated so that the ground-engaging tread portion of the tire 31 mounted on the wheel 32 attached to the axle is not in contact with the ground. The scriber assembly 33 is then placed with the scribe adjacent to but not in contact with the sidewall of the tire 31. The tire is then rotated by hand and a ruler is used to measure the distance between the scribe and the sidewall of the tire at random points as the tire is rotated. If the difference between the smallest and largest distances measured is greater than 3/16 inch (4.762 mm), it is an indication that the lateral runout of the wheel and tire assembly is excessive and corrective action should be sought through a tire dealer or a mechanic.

While certain representative embodiments and details have been shown for the purpose of illustrating the invention, it will be apparent to those skilled in the art that various changes and modifications may be made therein without departing from the spirit or scope of the invention.

What is claimed is:

1. A collapsible scriber assembly for checking the radial and lateral runout of a wheel and tire assembly and for marking a reference line on a tire, comprising:
   (a) a horizontal base assembly comprising at least two straight bar members, at least one of said straight bar members being hinged at the center of its length, and all of said straight bar members connected to each other at or near their ends by means for attaching and detaching;
   (b) at least one straight vertical member, having first and second ends, the first end attached hingably to one of the straight bar members of said horizontal base assembly in such a manner that when it is in its operative position said straight vertical member is perpendicular to said horizontal base assembly and extends vertically upward therefrom;
   (c) a pivot mechanism held in place perpendicular to said straight vertical member by means for attachment at or near the second end of said straight vertical member;
   (d) a pivot bar, with first and second ends, having a bore through it near the center of its length, a well in the first end and an eyelet attached to the second end, said pivot mechanism passing through the bore in the pivot bar so that said pivot bar may pivot in a vertical plane;
   (e) a scribe, used for providing a reference point and for making a reference line, inserted lengthwise in the well in the first end of said pivot bar and held in place by means for securing such as a set screw; and
   (f) a coil spring, having first and second ends, the first end of said coil spring affixed to the eyelet at the second end of said pivot bar, and the second end of said coil spring affixed to said horizontal base assembly, providing a stabilizing tension on the pivot bar.

2. A collapsible scriber assembly as described in claim 1, which has two straight vertical members, each of said straight vertical members having a horizontal bore through it near its second end, said horizontal bores being aligned with each other, and acting as the means for attachment for said pivot mechanism which is inserted through the aligned horizontal bores.

3. A collapsible scriber assembly as described in claim 1 or 2, wherein said straight bar members of said horizontal base, said straight vertical members and said pivot bar are made of hollow tubular construction.

4. A collapsible scriber assembly as described in claim 3, wherein said pivot mechanism is a bolt with a nut threadably attached to one end.

5. A collapsible scriber assembly as described in claim 4, further comprising a plurality of supporting feet, attached by means for attachment, at or near the ends of the hinged straight bar member of said horizontal base assembly.

* * * * *